United States Patent [19]

Lipson

[11] Patent Number: 5,706,624

[45] Date of Patent: Jan. 13, 1998

[54] PANELIZED, EDGE-CONNECTED, MODIFIED-RHOMBIC TRIACONTAHEDRAL STRUCTURES

[76] Inventor: Eric B. Lipson, 1318 Rosewood, Ann Arbor, Mich. 48104

[21] Appl. No.: 342,362

[22] Filed: Nov. 18, 1994

[51] Int. Cl.[6] .................................................. E04B 1/19
[52] U.S. Cl. ........................ 52/745.2; 52/282.2; 52/81.1; 52/582.1; 403/403
[58] Field of Search ................................ 52/282.2, 81.1, 52/582.1, 745.19, 745.2; 403/171, 176, 205, 382, 403; D25/121

[56] References Cited

U.S. PATENT DOCUMENTS

| | | |
|---|---|---|
| 2,388,297 | 11/1945 | Slaughter ........................ D25/121 X |
| 3,192,671 | 7/1965 | Smith . |
| 3,296,755 | 1/1967 | Chisolm . |
| 3,439,460 | 4/1969 | Allen . |
| 3,640,034 | 2/1972 | Shotwell . |

(List continued on next page.)

FOREIGN PATENT DOCUMENTS 2682166   4/1993   France ................................. 403/403

OTHER PUBLICATIONS

Deca Dome Fine Home Building Apr./May 1988, p.42.
Dymaxion World of R. Buckminster Fuller, Doubleday–Anchor Books 1973, pp.116–141.
Zome Primer, Steve Baer, 1972, pp. 1–15.
Domebook II, Pacific Domes 1971, pp. 12, 92, 93, 102, 103.

*Primary Examiner*—Carl D. Friedman
*Assistant Examiner*—Aimee E. McTigue
*Attorney, Agent, or Firm*—James M. Deimen

[57] ABSTRACT

A building system comprised of panelized, modified rhombic triacontahedral structures further comprised of panels continuously connected along their edges by connectors whose profiles allow panels to snap and slide together into strong, insulated buildings and unfasten for easy disassembly and re-use as temporary housing, storage, emergency shelter, work-camp and vacation homes. Vertical walls allow structures to be nested or mated together and allow use of standard doors, windows and fixtures. The connector is formed from extruded or cast plastic or aluminum, or formed steel. Carbon fiber or Dupont Kevlar™ reinforced resin may be used for specialized uses. The connector allows the use of a variety of standard manufacture laminated panels. The basic structure is comprised of ten identical wall panels and ten almost-identical roof panels joined by use of 35, 144° edge connectors. A minimum tripartite inventory, each of identical, easily mass produced parts, provides ease of production, shipping and assembly. The extruded plastic edge connector is easy to manufacture in relatively small scale industrial facilities. The edge connector and lightweight panel system increases efficiency, lowers costs (including foundation costs) and creates extraordinary ease of assembly and disassembly. A structure with a larger, rectangular entryway is created by use of a 126° connector along three facing edges, bisecting one lower ring roof panel and replacing two basic wall panels with two rectangular panels (or one double wide rectangular panel). This creates a structure having a wall with a larger entry capability obviating the need to otherwise increase structure size. Eliminating one entire lower roof panel; extending two wall panels to meet the upper roof ring instead of the lower roof ring and use of a 108° connector on five facing edges creates a concave building wall. The concavity is complementary to adjoining walls of a second structure and allows nesting of the structures.

1 Claim, 5 Drawing Sheets

U.S. PATENT DOCUMENTS

| | | |
|---|---|---|
| 3,733,102 | 5/1973 | Serino . |
| 3,953,949 | 5/1976 | O'Sheeran . |
| 4,133,149 | 1/1979 | Angress . |
| 4,258,513 | 3/1981 | Bergman . |
| 4,383,397 | 5/1983 | Ward ................................ 52/282.2 X |
| 4,425,740 | 1/1984 | Golden . |
| 4,462,191 | 7/1984 | Poirier . |
| 4,507,815 | 4/1985 | Danko ................................ 403/403 X |
| 4,621,467 | 11/1986 | Golden . |
| 4,651,478 | 3/1987 | Dahl . |
| 4,663,898 | 5/1987 | Yacaboni . |
| 4,784,172 | 11/1988 | Yacoboni . |
| 4,798,032 | 1/1989 | Rose . |
| 4,840,440 | 6/1989 | Dieter ................................ 403/403 X |
| 4,875,310 | 10/1989 | Shaughnessy . |
| 5,216,854 | 6/1993 | Emmert . |

PANELIZED, EDGE-CONNECTED, MODIFIED-RHOMBIC TRIACONTAHEDRAL STRUCTURES

BACKGROUND OF THE INVENTION

The field of the invention pertains to enclosed structures and, in particular, to lightweight easy-to-assemble structures.

The goal of inventing strong, light-weight, insulated structures that are easy-to-assemble and disassemble by few people with minimal instruction and simple tools for temporary or permanent uses has long been sought by designers and inventors. Rapid deployment and ease of assembly is an absolute necessity for disaster relief situations and many military uses.

Ease of disassembly is advantageous for temporary uses including military, disaster/refugee facilities and workcamps. In an era of massive natural and man-made disasters and population dislocations, the need for quickly assembled and disassembled temporary housing and utility buildings has become more and more acute. Also, in an era of increasing resource scarcity, efficient use of materials; efficient manufacture; and minimal waste are other priorities for a successful design.

There have been different strategies of design with the goal of achieving these ends. Tents have traditionally been used for temporary housing but lack insulation and security. For disaster relief, tents are basically one-time-use devices because ultraviolet radiation, strong winds and chemical rain take their toll on the cloth. A more permanent, substantial, re-useable structure is needed for many uses.

To improve the strength-to-weight ratio over "conventional" structures, regular polyhedra and crystalline geometric shapes have historically been used. A large number of patented structures have attempted (with various amounts of success) to use a variety of non-standard shapes and specially manufactured parts to achieve ease of manufacture, assembly and light weight.

The geodesic domes of R. Buckminster Fuller (U.S. Pat. No. 2,682,235); the rhombic triacontahedral structures of Steve Baer (U.S. Pat. No. 3,722,153) (which he dubbed "Zomes"); the modified rhombic triacontahedral structures of Fred Golden (U.S. Pat. No. 4,621,467); and the crystalline structures of Fred Golden (U.S. Pat. No. 4,425,750) are the most relevant examples to the instant device. All of these patents are variations on the same basic theme.

However, Fuller and most other dome designs require separate frame and skin assemblies similar to "standard" construction which precludes their use where maximally quick, easy assembly is required. In domical structures, curved walls create unfamiliar spaces for habitation and make it difficult to use standard doors and windows.

Panelizing structures, even conventional structures, has many advantages in reducing total parts, improving strength and easing assembly. Golden's panelized rhombic triacontahedron (U.S. Pat. No. 4,621,467) is an example of an "alternative" geometric structure of panelized design. Another example is the Deca Dome constructed by applicant in Ann Arbor, Mich. and featured in *Fine Homebuilding*, April/May, 1988.

Fuller's "Dymaxion Dwelling Unit" discussed in *The Dymaxion World of R. Buckminster Fuller* was an early use of both panelizing and alternative geometry. Its failure to achieve wide-spread usage is an issue for historians. Although it required quite expensive tooling to produce, it was not out of the reach of a large industrial concern and its potential promise was never fulfilled.

Golden's patents use panels and connectors, continuously connected at their edges, in his crystalline units (U.S. Pat. No. 4,425,750). However the irregular, angular walls again make standard doors and windows difficult and complicate assembly. The Vertical-walled, Rhombic Triacontahedral structures of Golden (U.S. Pat. No. 4,621,467) solve numerous problems by incorporating the frame; interior and exterior walls into a panel-and-connector system. The prior art fails to disclose a structure that is truly easy to assemble and disassemble yet insulated, substantial and secure enough for permanent and temporary uses and manufactured from an absolute minimum of differing parts.

SUMMARY OF THE INVENTION

A building system comprised of panelized interconnectable, modified rhombic triacontahedral structures comprises wall and roof panels continuously connected along their edges by connectors whose profiles allow panels to snap and slide together to form a building and unfasten for easy disassembly and re-use to form a building at a new location.

A regular rhombic triacontahedron has 30 identical rhombic facets which form a spheroid. The invention disclosed herein, in its most basic configuration, is a ⅔ rhombic triacontahedron (i.e. 20 facets). The invention modifies the regular rhombic triacontahedral shape by utilizing ten facets as roof panels and ten elongated vertical panels as walls. The ten rhombic facets which form the roof are five upper roof ring panels and five lower roof ring panels. Ten vertical panels form the walls by elongating the rhombi and cutting the bottoms horizontally where they meet the ground or foundation. Wall height and, therefore, roof height is variable as required by the intended use of the structure. Removing the top tips of the five upper roof ring panels creates an opening for a skylight and ventilation.

The "basic" structure uses 20 panels connected by 35 connectors with profiles angled at 144° to create a structure whose footprint is a decagon. The polyhedron created has all dihedral angles of 144°. The result is a strong, light-weight structure of aerodynamic shape which resists lifting-off in cross winds. Most wind conditions, even high winds, push the structure downward due to the shape of the roof and aerodynamic walls.

A relatively large rectangular-faced building wall is created by replacing two adjacent wall panels with one double-wide rectangular panel, bisecting one lower roof panel and using 126° connectors on three panel edges.

A structure with one pair of concave walls is created by eliminating one of the lower roof ring panels; extending two adjacent wall panels to the height of the lower edges of two upper roof panels and joining the two roof panels to the walls and to the concave wall panels using 5, 108° connectors.

Both optional designs create room for taller doorways than the basic structure with minimal loss of floor area and provide some visual relief from the basic structure's regularity.

Structures may be connected face-to-face or nested. Sealing joints for weather-tightness between basic structures requires a flexible gasket.

The connector's shape allows any type of stress-skin or solid panel to be used. The preferred embodiment uses extremely light weight foam-core panels with thin skins of hard, high tensile strength material such as plastic or aluminum. Greater impact resistance may be created by using steel skins although increased weight reduces portability. Projectile resistance may be created and light weight retained by using high molecular density plastic skins such as Dupont Kevlar™, reinforced resin and connectors of carbon fiber reinforced composites. Such high performance materials increase cost.

Connectors may be fastened to panels at the factory using permanent fasteners. When the building is assembled at the site, the open side of the connector is attached to a matching panel. When all wall panels are assembled, a pair of compression rings (nylon straps, each with a tensioning device) around the perimeter of the structure at the base and top of the wall panels retains the panels in place for temporary use. Permanent structures add fasteners or permanent adhesive to each connection.

Velcro® (hook and loop) fasteners on wall panels and mating Velcro® on the short arm of the connector profile assist speedy assembly and disassembly of the walls. Two-sided tape; adhesive backed gasket; or mechanical fasteners of various types may also be used to fasten and seal panels and connectors depending on the permanence and seal desired. Rivets, self tapping sheet-metal screws; and an extremely wide variety of commercially available plastic and metal fasteners may be used to retain panels.

The short, top arm or flange of the connector allows each wall panel to be loaded into a connector by swinging the panel into place, using the connector as a fulcrum and unloaded by swinging the panel in the reverse direction. The last wall panel has no Velcro® or adhesive on the panel and slides into place. The short, top flange also retains each panel as the structure is assembled.

The roof normally consists of ten full rhombic panels. Five panels form the lower roof ring and five panels form the upper roof ring. The five upper roof ring panels may be altered by having the peak ends shortened. This provides an opening at the peak for a skylight/ventilator and also effectively forms a "keyway" allowing the last two connectors and roof panel to slide into place from above. Roof panels preferably do not have Velcro® or tape on the panels and, therefore, slide into place. Gravity retains roof panels in position until they can be mechanically fastened.

The panel thickness selected by the builder or user preferably increases somewhat proportionally with width to increase panel strength for the larger structure. Cost per square foot of floor area is reduced by increasing panel width because of improved surface to volume ratio.

Assembly is possible by two or three minimally trained people with two step ladders and no special tools, on any flat surface in one to two hours. For emergency use, structures may be assembled on a driveway or on a pile of pea-gravel retained by a frame. For more permanent uses, a cement floor/foundation may also be poured inside the structure after it is assembled, using the walls as a form. This process also improves the anchoring.

The instant invention improves significantly on ease of assembly and manufacture. Whereas Golden's rhombic triacontahedral connector and panel system requires a specially manufactured panel to mate with the connector, the instant device uses any panel of appropriate thickness. This eliminates one specialized manufacturing step since many such panels are widely available. Panels need only be cut to the proper dimensions as illustrated in the waste-free cutting pattern below.

Additionally, Golden's rhombic triacontahedral structures have the "male" portion on the connector and the "female" portion as part of the panel. Reversing the sex, if you will, of the panels, and shortening one arm or flange of the connector in the instant invention, makes loading panels to connectors far easier. The high frictional nature inherent in the Golden rhombic triacontahedron makes assembly of panels problematic, especially in long lengths.

The instant invention is not as inherently water-proof as Golden's rhombic triacontahedron (which does not require a separate roof membrane). The trade-off is that the instant design dramatically improves the ease of assembly and disassembly of the structure. These features make the instant structure more adaptable for emergency uses where maximum ease of assembly is absolutely essential. For emergency and temporary uses, the instant invention uses a tarp for weather-proofing, shade and tie down which has advantages for disassembly, particularly. For permanent use, any of several commercial roll-roofing membranes can be cut into ten roof tiles, adhered to the roof and sealed as on any peaked roof. For permanent structures, vertices can be sealed with a variety of sealants and capped with a molded piece. Ends of connectors must be factory mitred and beveled appropriately.

Vertical walls allow easy nesting and mating of structures in unlimited variations with gaskets required to seal the facing panels where the structures join. The advantages of vertical walls include the psychological preference which the majority of people display for them over curved or slanted walls. Vertical walls also allow use of standard windows and doors such as those manufactured for the recreational vehicle industry.

DESCRIPTION OF THE PREFERRED EMBODIMENTS

Figure 1:
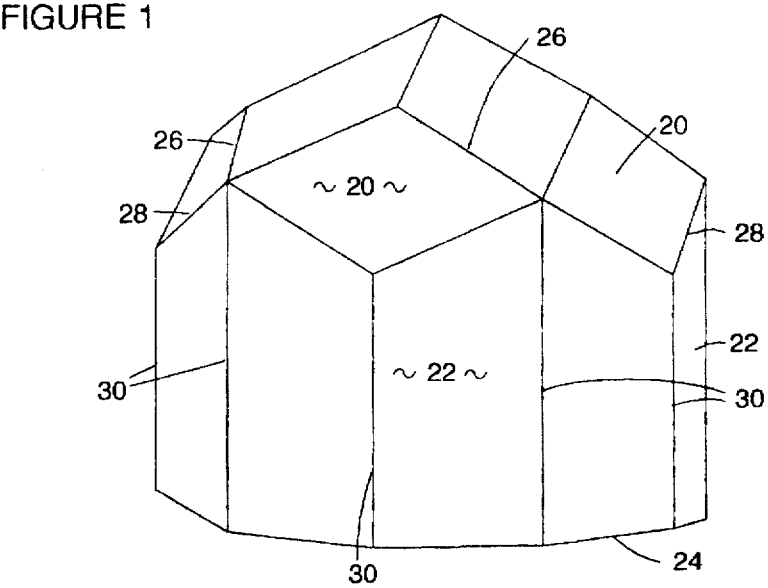
FIG. 1 is a front view of the basic, ⅔ rhombic triacontahedral structure.
Figure 2:
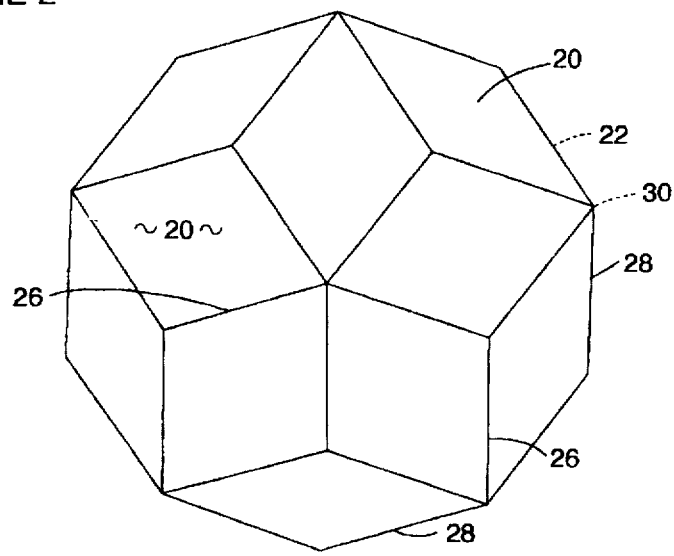
FIG. 2 is the basic decagonal floor plan and the roof viewed from above comprising five lower roof ring panels and five upper roof ring panels.

In FIGS. 1 and 2 the basic domical structure comprises the ten identical roof panels 20 and the ten identical wall panels 22. Since the wall panels are vertical they may be of any suitable height from a level ground plane 24. The panels 20 and 22 are joined by panel connectors along the panel edges 26 between roof panels; panel edges 28 between roof panels and wall panels and panel edges 30 between wall panels. Panel edges 26 and 28 are of identical length and therefore use identical panel connectors.

Panel edges 30 however, are dependent on wall panel edge height and, therefore, vary in height. To retain a simple tripartite inventory of simple parts for temporary disaster relief structures, the panel edges 30 can utilize the same panel connectors as the roof either by not connecting the full height of the edges 30 or by using two or more connectors per edge 30 trimmed to fit.

Figure 3:
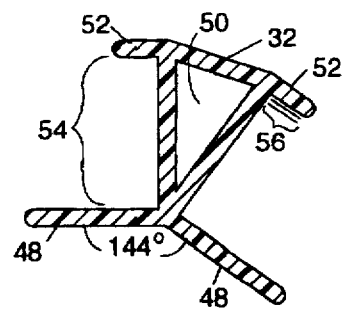
FIG. 3 is the profile of the 144° connector used to create the basic structure.

Illustrated in FIG. 3 is the 144° connector 32 in profile. Utilizing lightweight foam plastic panels 20 and 22 clad with aluminum or hard plastic and plastic connectors 32, any necessary doorways, windows, vents can be cut in with a simple hand key hole saw. Thus, a huge disaster relief tripartite inventory can consist of merely roof panels 20, wall panels 22 and connectors 32, each precut to one size for one size of dome.

Figure 4:
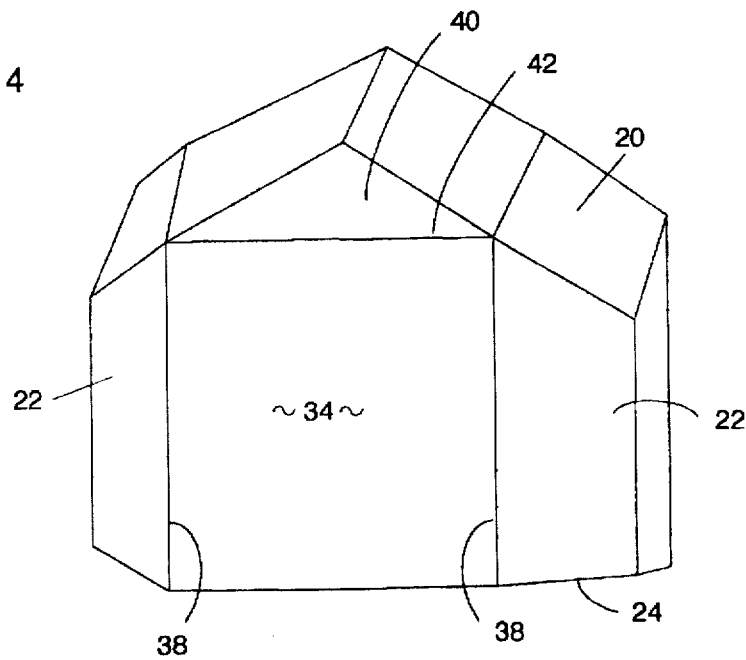
FIG. 4 is a front view of the rectangular-faced structure which creates a larger and taller panel for a doorway by bisecting one roof panel and replacing two of the basic wall panels with one double wide rectangular panel.
Figure 5:
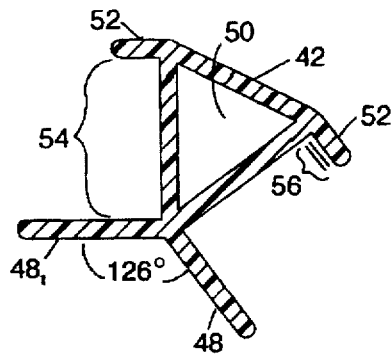
FIG. 5 is a profile of the 126° connector used to form the rectangular-faced structure.
Figure 6:
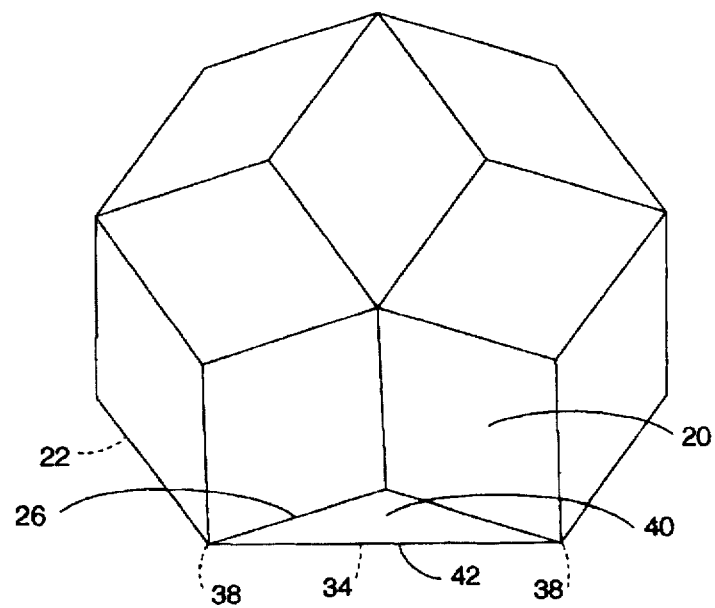
FIG. 6 is the floor plan of the rectangular-faced structure and the roof viewed from above.

Illustrated in FIGS. 4 and 6 is relatively large, flat wall panel 34 that effectively replaces two regular wall panels 22. To accommodate the larger flat wall panel 34 three 126° connectors 36 of the profile shown in FIG. 5 are utilized to join the larger panel edges to wall panels 22 at 38 and a modified roof panel 40 at 42. The modified roof panel 40 is merely a bisected roof panel 20.

Figure 7:
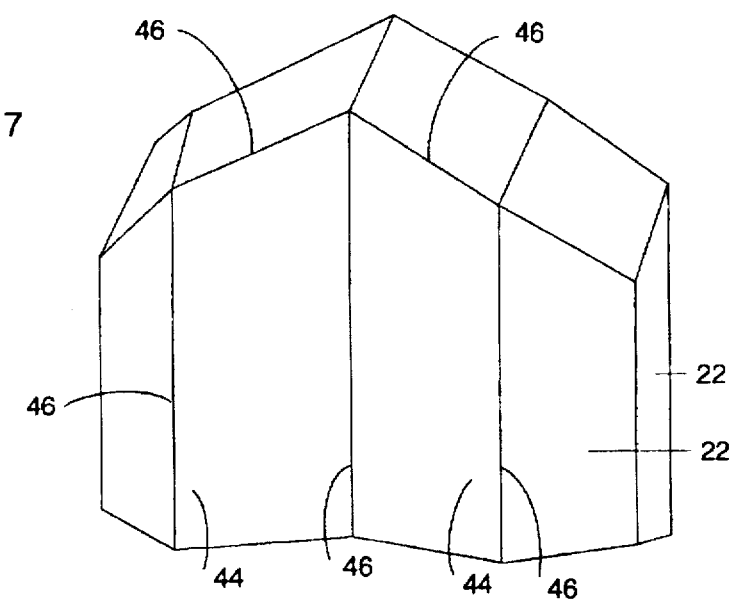
FIG. 7 is a front view of the concave structure.
Figure 8:
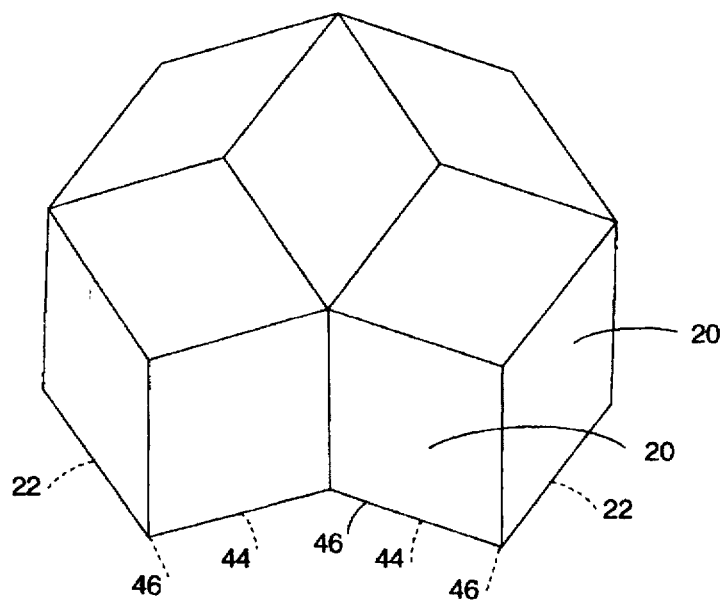
FIG. 8 is the concave structure viewed from above.

Illustrated in FIGS. 7 and 8 is a concave portion modified into the basic structure. The wall panels 44 of the concave portion are considerably taller than the other wall panels 22 and are connected to the basic structure of the dome by the 108° connectors 46 profiled in FIG. 9. Five 108° connectors 46 hold the taller wall panels 44 together, to the other wall panels 22, and to the roof panels 20 as indicated. The concave portion eliminates one full roof panel 20, however, the roof otherwise is as in the basic structure.

Figure 9:
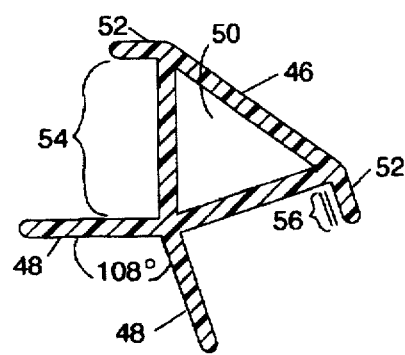
FIG. 9 is a profile of the 108° connector used to form the concave structure.
Figure 13A:
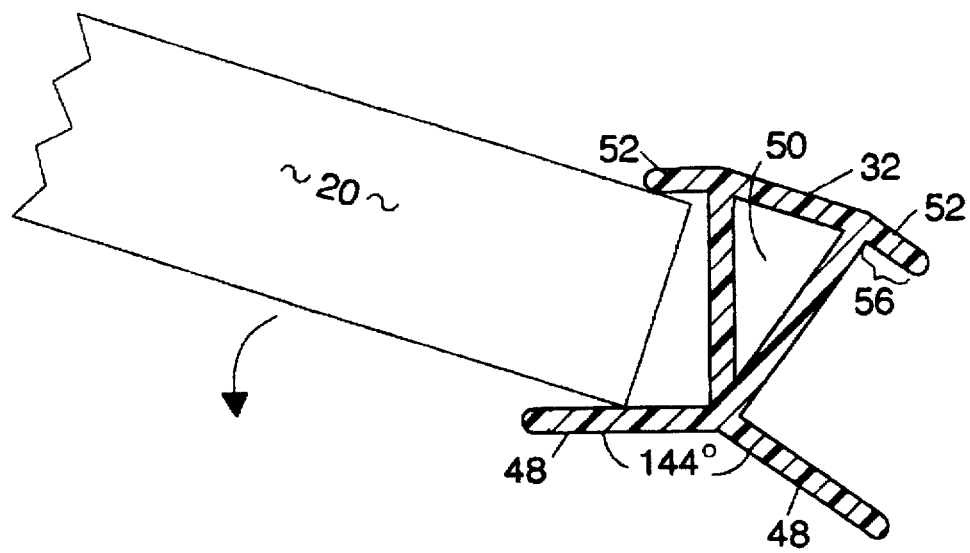
FIGS. 13A and 13B are profiles of a connector and cutaway portion of a panel showing the panel being swung into the connector and being fully engaged in the connector.
Figure 13B:
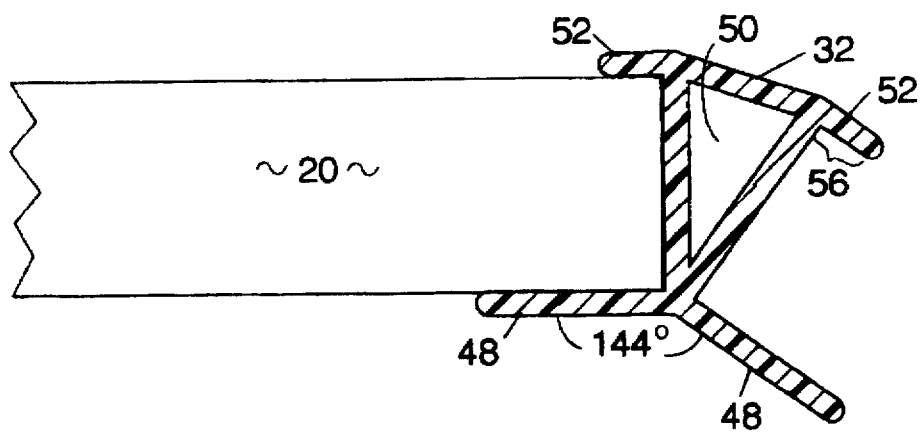

The 144°, 126°, and 108° panel connectors whose profiles are illustrated in FIGS. 3, 5 and 9 have a large lower supporting flange 48, a triangular hollow beam center portion 50 and shorter upper flange 52. This configuration allows easy loading and unloading of a panel by swinging or sliding panels in place as shown in FIGS. 13A and 13B and may be used in conjunction with a gasket, Velcro® or adhesive on the short upper flange 52 facing inside the connector 26, 42 or 48.

The ratio of the length of the lower flange 48 to the upper flange 52 is approximately 4:1. For most applications, the ratio of the length of the lower flange 48 to the panel thickness is about 1:1 for a one or two inch thick panel. For a four inch thick panel, the ratio drops to about 1:2. The throat 54 of the connector into which the panel slides is approximately 12.5%–15% wider than the thickness of the panel to ease assembly and allow space for sealant or Velcro®.

The connectors 26, 42 and 48 may be manufactured in a rigid configuration or allow some flexibility of one or both the flanges 48 and 52 relative to the beam center portion. Such flexibility in the flange 52 can assist in assembly where the underside 56 has Velcro® there-applied and a mating strip of Velcro® is applied to the panel surface adjacent the panel edge.

Figure 10:
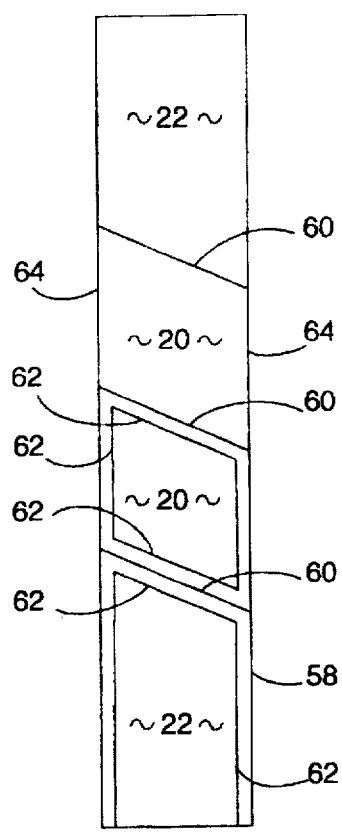
FIG. 10 is a no-waste panel cutting pattern.
Figure 11:
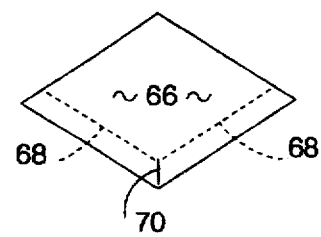
FIGS. 11 and 12 illustrate in plan view membranes for covering and sealing roof panels against water, dust and air leakage.
Figure 12:
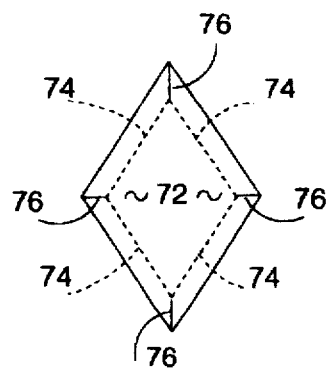

Illustrated in FIG. 10 is a strip of wall and roof panel 58 with cuts 60 indicated for forming roof panels 20 and wall panels 22 absent waste. Before or after cutting the panels, Velcro® strips 62 can be applied adjacent the cuts 60 and edges 64. And, illustrated in FIG. 11 and FIG. 12 are cover membranes for roof panels. In FIG. 11 a lower roof ring panel membrane 66 is shown as a slightly larger rhombus than the underlying roof panel indicated by the dashed lines 68. The membrane 66 may be slit at 70 to accommodate the slight overlap when the membrane is applied and the lower edges beyond dashed lines 68 are folded over the underlying connectors. A permanent or temporary adhesive may be applied to the underside of the membrane before application or Velcro® strips may be used to attach the membrane for temporary use.

In FIG. 12 an upper roofing panel membrane 72 is illustrated. For the upper roof ring panel membrane 72 the panel is indicated by the dashed lines 74 and the membrane extends beyond all four sides of the panel. All four corners may be slit at 76 to accommodate the slight overlap and the membrane 72 may be applied in the same manner as membrane 66 in FIG. 11. Commercial roll-roofing membranes cut to size are particularly suitable because the wax paper backing need only be peeled off to expose the adhesive.

I claim:

1. A method of assembling dome structure panels to edge connectors, at least one edge connector comprising in profile a central portion, a first pair of unequal length upper and lower flanges extending from one side of the central portion and a second pair of unequal length upper and lower flanges extending from the other side of the central portion, each pair of flanges being spaced apart and substantially parallel, and the upper flange being sufficiently shorter than the lower flange whereby the upper flange functions as a fulcrum when swinging a panel into full engagement with both flanges of the pair of flanges, the method comprising the steps of:

placing an upper surface of a panel into contact with the upper flange of the at least one connector, the contact being parallel and closely adjacent to a panel edge to be inserted into the at least one connector, swinging the panel in a substantially rotational motion about the contact with the upper flange, the upper flange thereby serving as a fulcrum to permit the panel edge to be placed into full engagement between the upper and lower flanges.

\* \* \* \* \*